May 19, 1959 R. W. WATKINS 2,887,072
DISCHARGE VALVE FOR ICE CREAM MACHINES
Filed March 30, 1956 2 Sheets-Sheet 1

INVENTOR.
ROGER W. WATKINS
BY *J. William Freeman*
ATTORNEY

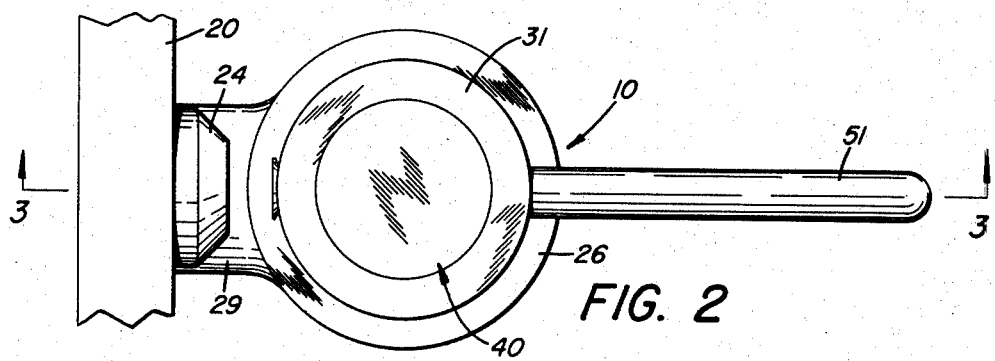
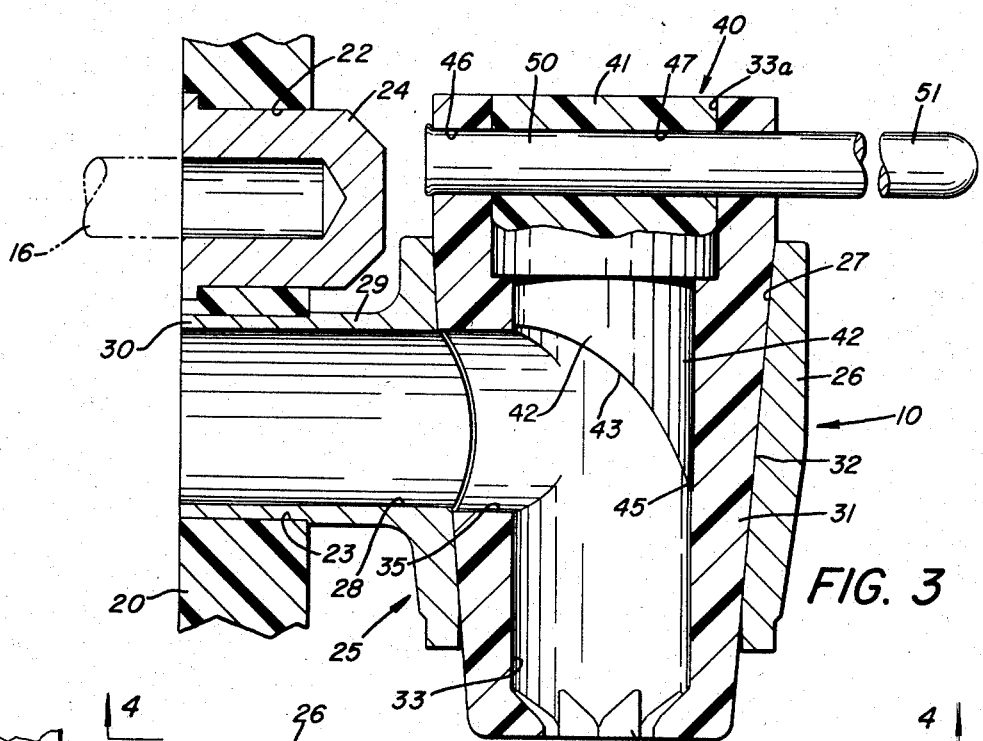
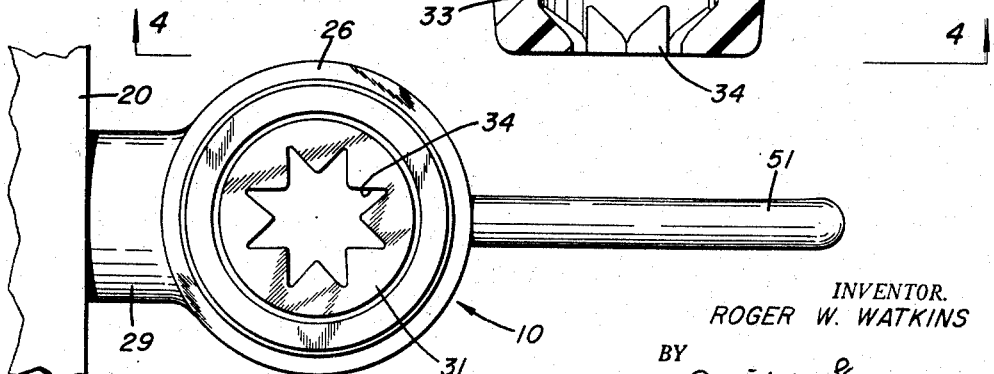
INVENTOR.
ROGER W. WATKINS

2,887,072
DISCHARGE VALVE FOR ICE CREAM MACHINES

Roger W. Watkins, Akron, Ohio

Application March 30, 1956, Serial No. 575,037

4 Claims. (Cl. 107—14)

This invention relates to discharge valves, and in particular has reference to an improved type of dispensing valves capable of utilization with ice cream machines where a viscous fluid is discharged at a relatively low temperature.

In the field of ice cream manufacture, the known prior art has utilized several types and forms of discharge valves and nozzles for controlling the emission of ice cream from the conventional type of freezer unit. These devices have ranged in complexity from a very simple type of sliding gate valve to relatively complex spring-loaded mechanisms. Without exception, all of the aforementioned valves have possessed two inherent drawbacks due to the nature of the viscous product with which the same are used.

First, because of the low temperature involved in dispensing ice cream, it has been found that the ice cream product will become isolated in remote areas of the valving means, and as a result of the low temperature present in these remote areas, the ice cream will freeze into a solid mass. Such "freeze-ups," as they are conventionally referred to in the trade, necessitate dismantling the discharge valve and cleaning the entire mechanism thereof.

The second inherent disadvantage relates to the operating structure of these valves, and has particular reference to the inability of the same to be readily interchanged. In present-day practice, such interchanging of the spout portion is highly desirable for a plurality of reasons, one of which is the desirability to impart different designs on different types of products being sold.

A still further disadvantage of the known prior art relates to the fact that the known devices thereof are incapable of effectuating a self-cleaning operation during usage, with the result that due to strict hygienic standards controlling the sale of ice cream products, it is necessary that these parts be frequently cleaned, with the result that the machine is out of operation for a considerable period of time during such cleaning.

It is accordingly a principal object of this invention to provide a discharge valve for ice cream machines that is characterized by having a direct flow path for ice cream products flowing therethrough, with the result that the valve has no remote areas within which the ice cream product can become isolated.

It is a further object of this invention to provide a discharge valve for ice cream machines that is characterized by the ease with which a plurality of design-imparting spouts can be easily and quickly interchanged in the main support therefor.

It is a still further object of this invention to provide an improved type of ice cream dispensing valve that is self-cleaning in operation, with the result that a machine utilizing the improved discharge valve will have a minimum amount of "down" time.

It is a still further object of this invention to provide a discharge valve for use on ice cream machines that is characterized by extreme simplicity of operation and which may have the component parts thereof easily and quickly interchanged by unskilled labor.

These and other objects of the invention will become more apparent upon a reading of the following brief specification, considered and interpreted in the light of the accompanying drawings.

Of the drawings:

Figure 2 is a top plan view of the improved valve attached to an ice cream machine.

Figure 3 is a vertical section taken on the lines 3—3 of Figure 2.

Figure 4 is a horizontal section taken on the lines 4—4 of Figure 3.

Figure 1:
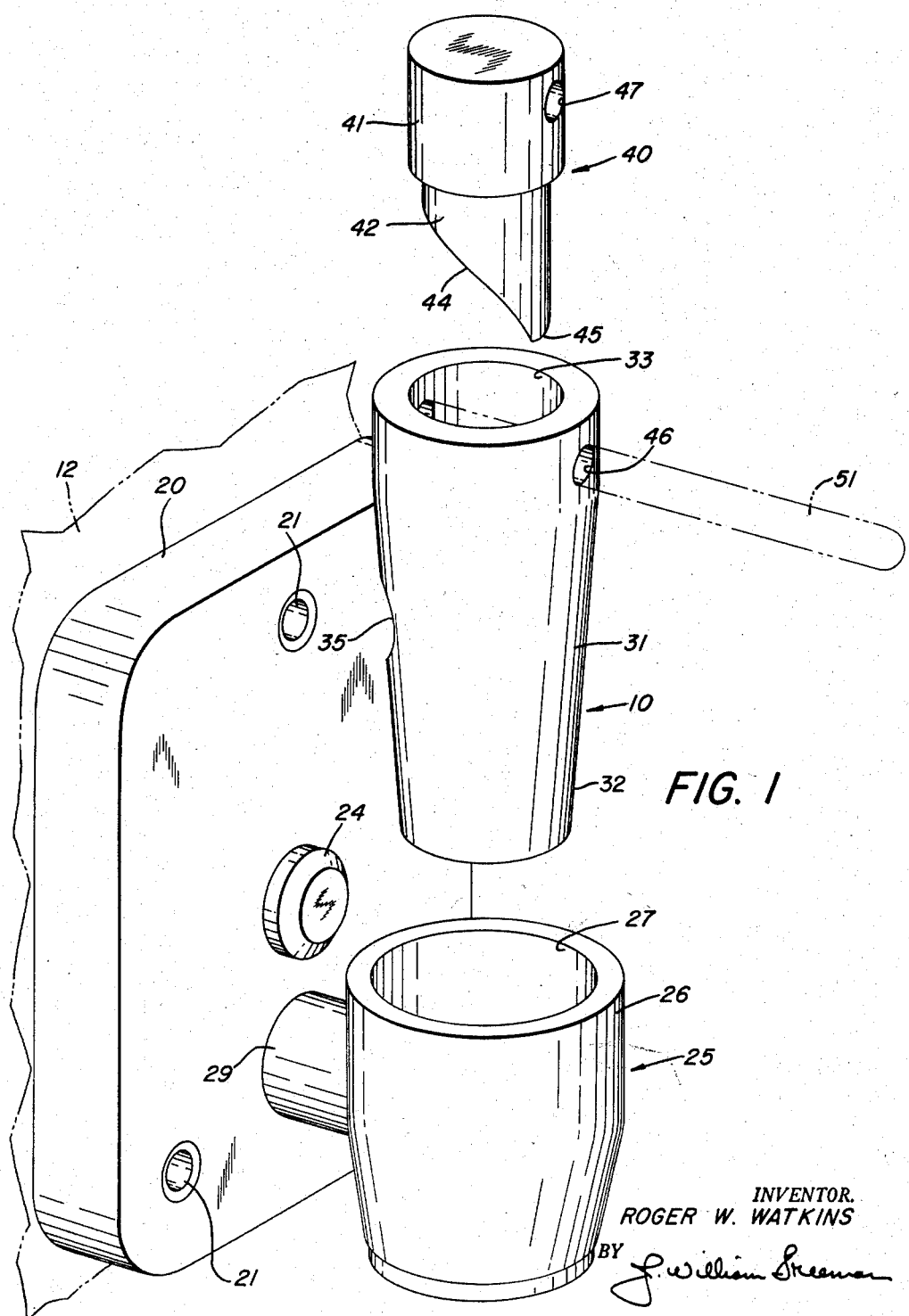
Figure 1 is an exploded perspective view of the improved discharge valve.

Referring now to the drawings, and in particular to Figures 1 and 3 thereof, the improved discharge valve, generally indicated by the numeral 10, is shown mounted on the front wall of an ice cream machine 12 that has only a fragmentary portion thereof illustrated in the drawings. It is to be understood that the ice cream machine 12 may be of known type wherein a discharge opening is provided in a wall portion thereof for dispensing ice cream into the discharge valve 10 under pressure. It is apparent that any one of several known types of ice cream machines could be used in this regard, and further that the novel discharge valve of this invention could be used with any such machines.

Referring now particularly to Figure 1, the improved discharge valve 10 is shown as having a rectangular plate 20 secured as by bolts 21, 21, to an exterior face of the ice cream machine 12, with the plate 20 being apertured as at 22, 23 to respectively receive a bearing support 24 and a support bearing that is generally indicated by the numeral 25, with the member 24 carrying the shaft 16 which projects interiorly of the ice cream machine 12.

As will best be seen from Figure 3, the support bearing 25 includes a vertically extending cylindrical bushing 26 having a tapered cylindrical inner wall 27 within which the control means may be seated as will be described. This bushing 26 is also shown apertured as at 28 to define a cylindrical sleeve 29; the reduced end 30 of which may be received in press fit relationship within the aperture 23 that is provided on plate 20. In this manner, the support bearing 25 is fixedly secured both with respect to ice cream machine 12 and the plate 20.

Receivable within the cylindrical bushing 26, as best shown in Figures 1 and 3 of the drawings, the control means that includes a tubular discharge spout 31 that has the external diameter 32 thereof tapered so as to be complemental with the tapered surface 27, while the internal diameter 33 thereof is shown as being cylindrical for reception of a diverting plug 40, as will presently be described. The lower end wall of the discharge spout 31 (see Figures 1 and 3) is shown partially closed by a star-shaped opening 34 through which will flow ice cream that has been introduced interiorly of spout 31 as a result of entrance through aperture 35 that is provided in one wall of the discharge spout 31. This aperture 35 is shown aligned with the opening 28 in support bearing 25 so that ice cream being discharged from the machine can flow into sleeve 29 for entrance into discharge spout 31 through opening 35, with final ejection or emission occurring through the star-shaped opening 34 that is provided at the lower end of discharge spout 31.

As previously indicated, the discharge spout 31 is equipped with a diverter plug 40. This plug 40 comprises an upper section 41 and a lower section 42; the arrangement being such that the upper section 41 seats within an enlarged bore 33a of spout 33, while the lower portion 42, being cylindrical in cross-section, is received against the cylindrical surface 33, as best shown in Figure 3.

To the end of effectuating the desired diverting action, the lower section 42 has the lowermost end thereof (Figure 3) defined by a compound arcuate face that is given the numeral 43. This face, while being arcuate with respect to its vertical sectional configuration, is shown in Figure 3 as having the opposed edge portions 44, 44 thereof tapering to a relatively thin point 45. In this manner, all portions of the edge 44, being located in the radial periphery of the section 42, will be in contact with the surface 33, and ice cream being directed against the surface 43 will be diverted downwardly towards the discharge spout 34.

To the end of making the members 31 and 40 rotatable in unison about a common axis, these members 31 and 40 are provided with aligned apertures 46 and 47, respectively; the arrangement being such that upon alignment of these apertures a pin 50 can be inserted therethrough so that the handle portion 51 thereof can be used to rotate the members between the open and closed position by relatively rotating the members 31 and 40 with respect to the support bearing 25.

In use or operation of the improved dispensing valve 10, it will first be assumed that the same has been positioned on the front portion of an ice cream machine 12 by the use of conventional bolts (not shown) inserted through apertures 21, 21 of plate 20. It will further be assumed that in positioning the plate 20 with respect to the ice cream machine 12, that the aperture 23 of plate 20 has been aligned with the discharge opening in the machine so as to receive ice cream dispensed therefrom.

At this point, the device is ready to operate, and when the component parts are positioned as shown in Figures 2 and 3 of the drawings, it is apparent that the valve 10 is open so that ice cream may be emitted through passage 28, aperture 35, passage 33 and end opening 34. During such flow of fluid through the just-described passageways, it is apparent that ice cream will be diverted towards the opening 34 as the result of being diverted across the contoured surface 43 that is provided on the lower portion 42 of plug 40. In this manner, it will be impossible for any ice cream to occupy the space filled by the plug 40 and the component parts thereof; and as a result, the likelihood of "freeze-ups" occurring in mechanisms of this type, is highly remote.

When it is desired to shut off the flow of ice cream, it is merely necessary that the handle 51 be turned approximately 90 degrees from the position shown in Figures 2 and 4. Such turning movement of the handle 51 will result in a similar turning movement of discharge spout 31 and plug 40, with the result that the opening 35 in discharge spout 31 will move out of registry with the cylindrical bore 28 that is provided in the support bearing 25.

In this manner, ice cream will occupy the bore 28, but will not be able to enter the discharge spout 31. It is apparent that return of the handle 51 to the position of Figures 2 or 4 will result in the resumption of fluid flow through the valving mechanism 10.

When it is desired to change dispensing spouts either for the purpose of cleaning or for providing a different design-imparting opening 34, the handle 51 is merely lifted upwardly so that the entire assembly, as defined by the pin 50, plug 40 and discharge spout 31 is removed from its position of support within the bearing support 25. At this time the pin 50 may be shifted aixally of the bores 46 and 47 so as to remove the same with respect to the spout 31 and the plug 40, at which time these component parts may be separated from each other by merely inverting the discharge spout 31. At this time, the plug 40 may for example, be placed in another discharge spout of equal internal diameter having a design-imparting configuration at the opening 34. With the pin 50 inserted through openings 46 and 47, this entire assembly may be reinserted within the support bearing 25, at which time the dispensing of ice cream may be resumed.

It will be seen from the foregoing that there has been provided a new and novel type of dispensing valve having particular adaptability in connection with the dispensing of ice cream from freezer machines. It has been shown how the structure of the same is such that the control means sub-assembly may be easily rotated and/or removed with respect to the main support housing, with the result that the component parts may be easily removed and cleaned or interchanged as the case requires. It will further be seen how the use of an auxiliary plug in the dispensing spout eliminates the problem of "freeze-ups" as the result of serving the dual purpose of occupying remote areas and simultaneously serving as a deflector baffle for ice cream being emitted.

It will also be seen that by using the complementally tapered surfaces on the bearing support and discharge spout as illustrated in the preferred embodiment of the invention that a self-cleaning action is obtained as a result of the discharge spout serving to scrape away any residual ice cream that may be provided on the bearing surface of the support bearing. It is apparent in this regard that other equivalent means, such as a shoulder stop, could be utilized in this regard to insure registry between the openings in the housing and spout.

While a full and complete description of the invention has been set forth in detail in the preceding paragraphs in accordance with the requirements of the United States Patent Statutes, it is to be understood that the scope of this invention is not so limited. Thus, while the component parts of the valve per se have been shown as being made of plastic material because of the non-heat conducting properties thereof, it is to be understood that steel or other suitable materials could be substituted therefor without the exercise of invention.

Accordingly, modifications of the invention relating to size, configuration or material composition may be resorted to without departing from the spirit hereof or the scope of the appended claims.

What is claimed is:

1. A discharge valve for low temperature fluids, comprising; an open ended hollow cylindrical support having a supply conduit provided in the wall portion thereof; a complemental cylindrical hollow sleeve having an axial length thereof concentrically journaled within said support and having an aperture provided in one wall thereof; means for disposing said aperture and said conduit in a common radial plane whereby rotation of said sleeve around said common axis will move said aperture thereof into and out of registry with said conduit; and a cylindrical plug member concentrically telescoped interiorly of said sleeve and having one axial end thereof being contoured as a diverter blade; said diverter blade being positioned adjacent said aperture, whereby the same may divert fluid from said conduit and said aperture through one said open end of said hollow cylindrical support during registry of said aperture and said conduit.

2. The device of claim 1 further characterized by the presence of means for rotating said plug and said sleeve in unison relatively of said support.

3. The device of claim 2 further characterized by the fact that said means include a handle passed through registering transverse bores provided in said sleeve and said plug.

4. The device of claim 1 further characterized by the fact that said first mentioned means include complementally tapered surfaces provided on the interior wall of said support and the exterior wall of said sleeve.

References Cited in the file of this patent

UNITED STATES PATENTS

| 2,667,846 | Grumbly | Feb. 2, 1954 |
| 2,669,945 | Wildebour | Feb. 23, 1954 |
| 2,731,925 | Carvel | Jan. 24, 1956 |
| 2,736,274 | Atkins | Feb. 28, 1956 |
| 2,736,534 | Atkins | Feb. 28, 1956 |